No. 640,908. H. K. HESS. Patented Jan. 9, 1900.
PROCESS OF AND APPARATUS FOR MAKING CHLORID OF ZINC.
(Application filed Apr. 22, 1899.)
(No Model.)
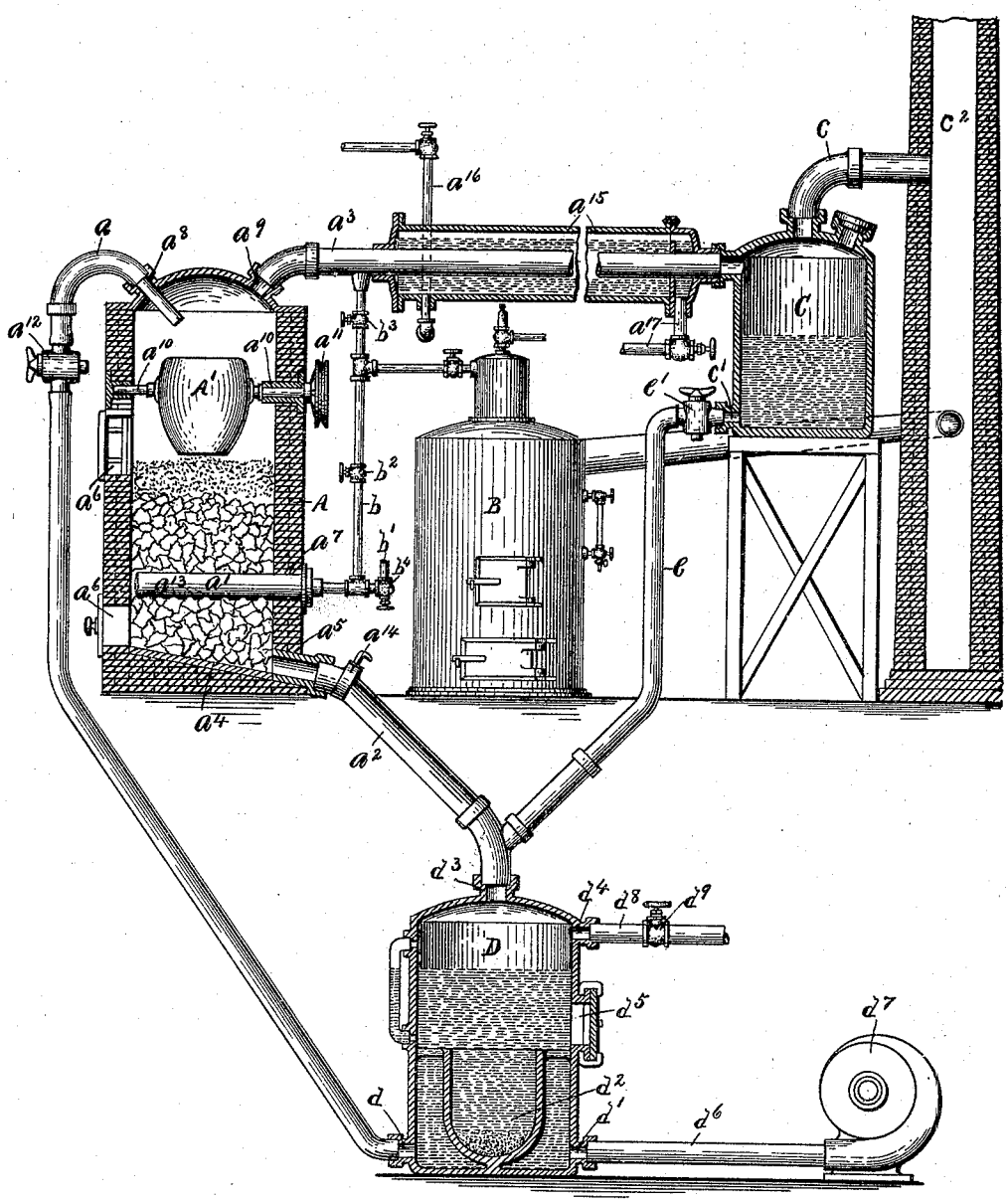
WITNESSES:
INVENTOR
BY
ATTORNEYS

UNITED STATES PATENT OFFICE.

HENRY K. HESS, OF PHILADELPHIA, PENNSYLVANIA.

PROCESS OF AND APPARATUS FOR MAKING CHLORID OF ZINC.

SPECIFICATION forming part of Letters Patent No. 640,908, dated January 9, 1900.

Application filed April 22, 1899. Serial No. 714,120. (No model.)

*To all whom it may concern:*

Be it known that I, HENRY K. HESS, of Philadelphia, in the county of Philadelphia, in the State of Pennsylvania, have invented a new and useful Apparatus and Process for the Decomposition and Formation of Metallic Chlorids in the Manufacture of Hydrogen Gas, of which the following, taken in connection with the accompanying drawing, is a full, clear, and exact description.

My invention has for its object the production of an apparatus and process for the decomposition and formation of metallic chlorides in the manufacture of hydrogen gas which is particularly simple and efficient; and to this end it consists in the combination, construction, and arrangement of the component parts of said means and in the mode of treatment of the metallic chlorides, as hereinafter fully described, and pointed out in the claims.

In describing this invention reference is had to the accompanying drawing, which is a vertical sectional view, partly in elevation, of an apparatus embodying my invention and in which like letters indicate corresponding parts.

Said apparatus for the decomposition and formation of metallic chlorides, as chloride of zinc, in the manufacture of hydrogen gas preferably consists of a furnace A, inlet and outlet conduits $a$ $a'$ $a^2$ $a^3$, communicating with the furnace, steam and air conduits $b$ $b'$, means for cooling one of the outlet-conduits, receptacles C D, an exhaust-conduit $c$, and a conduit $e$, connecting said receptacles. Said furnace A is of any desirable form, size, and construction for receiving the material to be treated and is usually provided with an inclined bottom $a^4$, an outlet-opening $a^5$, extending above the lower portion of said bottom, and one or more manholes $a^6$. The lower portion of the furnace A is generally formed with an opening $a^7$, arranged above the opening $a^5$ and beneath the level of the fuel and the material to be treated, as chloride of zinc. The upper portion of said furnace is usually formed crowning and is provided with inlet and outlet openings $a^8$ $a^9$, communicating, respectively, with the inlet-conduit $a$ for the material to be treated and the outlet-conduit $a^3$ for the hydrochloric-acid fumes and other gases, as carbonic oxide, generated within the furnace A. Said upper portion of the furnace A preferably contains a chamber A', which receives the metallic chloride discharged from the conduit $a$ within the furnace A, is formed graphite or other suitable material, and is of axially movable for discharging said material upon a heated body of carbon, as coke, within the furnace. In order to facilitate the axial movement of the chamber A', opposite sides of said chamber are generally provided with trunnions $a^{10}$, journaled in bearings in adjacent walls of the furnace A, and one of said trunnions is equipped with an operating-wheel $a^{11}$.

The inlet-conduit $a$ is preferably provided with a valve $a^{12}$ or other means for controlling the passage of the material therethrough, extends downwardly beneath the furnace A, and communicates with the lower portion of the receptacle D, presently described. The inlet-conduit $a'$ extends through the opening $a^7$ into the furnace A, is generally provided with openings $a^{13}$ in its lower portion, and serves to discharge steam and air either separately or simultaneously into a body of coke within said furnace. The outlet-conduit $a^2$ is provided with a valve $a^{14}$ or other suitable means for controlling the passage of the material therethrough and communicates with the outlet-opening $a^5$ in the lower portion of the furnace A and with the upper portion of the receptacle D. The outlet-conduit $a^3$ is of any desirable form, size, and construction and usually passes through means, presently described, for cooling said conduit. The steam-conduit $b$ communicates at its intermediate portion with any desirable source of steam, as a heater B, its opposite ends discharge, respectively, into the conduits $a'$ $a^3$, and its intermediate portion is provided with valves $b^2$ $b^3$ for controlling the passage of the steam to the conduits $a'$ $a^3$ in order that steam may be admitted to said conduits separately or simultaneously. It is obvious, however, that the steam-conduit $b$ may communicate with the inlet-conduit $a'$ only. The air-conduit $b'$ is suitably connected to the conduit $a'$ and is provided with a valve $b^4$.

The means for cooling the conduit $a^3$ preferably consist of a water-containing chamber $a^{15}$ and inlet and outlet conduits $a^{16}$ $a^{17}$, connected to the chamber $a^{15}$ for effecting a circulation of the water through said chamber. The receptacle C is of any desirable form, size, and construction and is provided at its lower portion with an outlet-opening $c'$ and at its upper end with inlet and outlet openings connected, respectively, to the outlet and exhaust conduits $a^3 c$. Said exhaust-conduit $c$ is generally connected to a smoke flue or chimney $c^2$. The conduit $e$ is provided with a valve $e'$ or other suitable means for controlling the passage of the material therethrough and communicates with the opening $c'$ of the receptacle C and with the upper portion of the receptacle D, being usually united at its lower end to the lower end of the outlet-conduit $a^2$. The receptacle D is also of any desirable form, size, and construction and is provided with openings $d\ d'$ and a chamber $d^2$ in its lower portion, openings $d^3\ d^4$ in its upper portion, and one or more manholes $d^5$. Said openings $d\ d'$ communicate, respectively, with the inlet-conduit $a$ for the furnace A and an air-inlet conduit $d^6$, which is preferably connected to a suitable pressure device, as an air-pump $d^7$. The chamber $d^2$ receives and supports a metal, as zinc, which is capable of uniting with the chlorin of hydrochloric acid to form chloride of zinc and liberate hydrogen gas. The openings $d^3\ d^4$ communicate, respectively, with the outlet-conduit $a^2$ for the furnace A and a gas-outlet conduit $d^8$, which is provided with a valve $d^9$ or other suitable device for controlling the passage of the gas through said conduit.

In the operation of my apparatus and in carrying out my process a body of carbon, as coke, is inserted through one of the manholes $a^6$ of the furnace A and is heated to incandescence, the heating of the coke being usually facilitated by discharging air thereinto from the conduits $b'\ a'$. The pressure device $d^7$ is actuated to discharge air under pressure into the receptacle D and force the liquid and metallic chloride from said receptacle through the conduit $a$ into the chamber A'. The liquid is evaporated from the metallic chloride during the heating of the coke to incandescence and escapes as steam through the conduit $a^3$, receptacle C, and conduit $c$ to the smoke-flue or chimney $c^2$. As soon as the coke is heated above the melting-point of the metal of the chloride and the liquid is driven off from the metallic chloride within the chamber A' said chamber is rocked on its axis for discharging the metallic chloride therein upon the heated body of coke. The valve $b^2$ is then opened and steam is discharged from the inlet-conduit $a'$ into the body of coke, whereupon said steam is immediately decomposed, forming oxygen and hydrogen gases. The oxygen unites with the coke for accelerating the combustion, the hydrogen combines with the chlorine of the metallic chloride, forming hydrochloric acid, and the metal of the chloride, being molten, passes through said body of coke to the bottom of the furnace and is withdrawn at will through the conduit $a^2$ into the receptacle D. The heat of the coke immediately vaporizes the hydrochloric acid formed by the chlorine and hydrogen, and the acid fumes, together with any other gases, as carbonic oxide, formed in the furnace A, pass into the conduit $a^3$. The steam discharged into said conduit $a^3$ absorbs the hydrochloric-acid fumes and passes into the receptacle C as hydrochloric acid, whence it is conducted by the conduit $e$ to the receptacle D. Said other gases pass through the upper end of the receptacle C and the exhaust-conduit $c$ into the smoke-flue or chimney $c^2$. The metal and hydrochloric acid discharged into the receptacle D from the conduits $a^2\ e$ unite within said receptacle to form hydrogen and a metallic chloride. The hydrogen readily escapes through the conduit $d^8$, and the metallic chloride is returned to the furnace A.

My apparatus and process for the decomposition and formation of metallic chlorides in the manufacture of hydrogen gas will now be understood upon reference to the foregoing description and the accompanying drawing, and it will be readily noted by those skilled in the art that the gas formed by said means and method is particularly free from impurities.

Having thus fully described my invention, what I claim as new, and desire to secure by Letters Patent, is—

1. In an apparatus for the decomposition and formation of a metallic chloride in the manufacture of hydrogen gas, the combination of a furnace for decomposing a metallic chloride and forming hydrochloric acid, an inlet-conduit for supplying steam to the interior of the furnace, a receptacle for receiving the metal liberated in the furnace and said hydrochloric acid, which unite to form a metallic chloride and generate hydrogen gas, and means for conducting said metal and the hydrochloric acid from the furnace to the receptacle and for conducting the metallic chloride from the receptacle to the furnace, substantially as and for the purpose described.

2. In an apparatus for the decomposition and formation of a metallic chloride in the manufacture of hydrogen gas, the combination of a furnace for decomposing a metallic chloride and forming hydrochloric acid, a chamber within the furnace for holding the metallic chloride during the evaporation of the moisture therefrom, an inlet-conduit for supplying steam to the interior of the furnace, a receptacle for receiving the metal liberated in the furnace and said hydrochloric acid which unite to form a metallic chloride and generate hydrogen gas, and means for conducting said metal and the hydrochloric acid from the furnace to the receptacle and for conducting the metallic chloride from the receptacle to the chamber in the furnace, substantially as and for the purpose specified.

3. In an apparatus for the decomposition and formation of a metallic chloride in the manufacture of hydrogen gas, the combination of a furnace for decomposing a metallic chloride and forming hydrochloric acid, said furnace being provided with an inlet-opening for the metallic chloride, and an outlet-opening for the liberated metal, a receptacle for receiving the metal liberated in the furnace and said hydrochloric acid which unite to form a metallic chloride and generate hydrogen gas, and a conduit communicating with the outlet-opening of the furnace and with the receptacle, substantially as and for the purpose specified.

4. In an apparatus for the decomposition and formation of a metallic chloride in the manufacture of hydrogen gas, the combination of a furnace for decomposing a metallic chloride and forming hydrochloric acid, said furnace being provided with an inlet-opening for the metallic chloride, and an outlet-opening for the liberated metal, an inlet-conduit for discharging steam into the furnace between the planes of said inlet and outlet openings, a receptacle for receiving the metal liberated in the furnace and said hydrochloric acid which unite to form a metallic chloride and generate hydrogen gas, and a conduit communicating with the outlet-opening of the furnace and with the receptacle, substantially as and for the purpose described.

5. In an apparatus for the decomposition and formation of a metallic chloride in the manufacture of hydrogen gas, the combination of a furnace for decomposing a metallic chloride and forming hydrochloric acid, an inlet-conduit for supplying steam to the interior of the furnace, an outlet-conduit communicating with the furnace for conducting the hydrochloric acid therefrom, a receptacle for receiving said acid from the outlet-conduit, a second receptacle for receiving the metal liberated in the furnace and said hydrochloric acid which unites to form a metallic chloride and generate hydrogen gas, and a conduit for conducting the acid from the first receptacle to the second receptacle, substantially as and for the purpose described.

6. In an apparatus for the decomposition and formation of a metallic chloride in the manufacture of hydrogen gas, the combination of a furnace for decomposing a metallic chloride and forming hydrochloric acid, an inlet-conduit for supplying steam to the interior of the furnace, an outlet-conduit communicating with the furnace for conducting the hydrochloric acid therefrom, a steam-conduit for discharging steam into the outlet-conduit, means for cooling the outlet-conduit, a receptacle for receiving said acid from the outlet-conduit, a second receptacle for receiving the metal liberated in the furnace and said hydrochloric acid which unite to form a metallic chloride and generate hydrogen gas, and a conduit for conducting the acid from the first receptacle to the second receptacle, substantially as and for the purpose specified.

7. In an apparatus for the decomposition and formation of a metallic chloride in the manufacture of hydrogen gas, the combination of a furnace for decomposing a metallic chloride and forming hydrochloric acid, said furnace being provided with an outlet-opening for the liberated metal, an outlet-conduit communicating with the furnace for conducting the hydrochloric acid therefrom, a receptacle for receiving said acid from the outlet-conduit, a second receptacle for receiving the metal liberated in the furnace and said hydrochloric acid which unite to form a metallic chloride and generate hydrogen gas, and conduits for respectively conducting the liberated metal and the hydrochloric acid from the outlet-opening of the furnace and the first receptacle to the second receptacle, substantially as and for the purpose described.

8. In an apparatus for the decomposition and formation of a metallic chloride in the manufacture of hydrogen gas, the combination of a furnace for decomposing a metallic chloride and forming hydrochloric acid, said furnace being provided with an outlet-opening for the liberated metal, an inlet-conduit discharging into the furnace, an outlet-conduit communicating with the furnace for conducting the hydrochloric acid therefrom, a steam-conduit discharging into the inlet and outlet conduits, means for cooling the outlet-conduit, a receptacle for receiving said acid from the outlet-conduit, a second receptacle for receiving the metal liberated in the furnace and said hydrochloric acid which unite to form a metallic chloride and generate hydrogen gas, and conduits for respectively conducting the liberated metal and the hydrochloric acid from the outlet-opening of the furnace and the first receptacle to the second receptacle, substantially as and for the purpose specified.

9. In an apparatus for the decomposition and formation of a metallic chloride in the manufacture of hydrogen gas, the combination of a furnace for decomposing a metallic chloride and forming hydrochloric acid, an inlet-conduit for supplying steam to the interior of the furnace, a receptacle for receiving the metal liberated in the furnace and said hydrochloric acid which unite to form a metallic chloride and generate hydrogen gas, and a conduit communicating with the furnace and the receptacle for conducting the metallic chloride from the receptacle to the furnace, substantially as and for the purpose set forth.

10. In an apparatus for the decomposition and formation of a metallic chloride in the manufacture of hydrogen gas, the combination of a furnace for decomposing a metallic chloride and forming hydrochloric acid, said furnace being provided with an outlet-opening for the liberated metal, an inlet-conduit discharged into the furnace, an outlet-conduit communicating with the furnace for conducting the hydrochloric acid therefrom, a steam-conduit discharging into the inlet and outlet conduits, means for cooling the outlet-conduit, a receptacle for receiving said acid from the outlet-conduit, a second receptacle for receiving the metal liberated in the furnace and the hydrochloric acid which unite to form a metallic chloride and generate hydrogen gas, conduits for respectively conducting the librated metal and the hydrochloric acid from the outlet-opening of the furnace and the first receptacle to the second receptacle, and a conduit communicating with the furnace and the receptacle for conducting the metallic chloride from the receptacle to the furnace, substantially as and for the purpose described.

11. The herein-described process for the decomposition and formation of a metallic chloride in the manufacture of hydrogen gas, the same consisting in heating the metallic chloride by a body of carbon in contact therewith and in a state of combustion, introducing steam into the carbon, subjecting the heated metallic chloride to the action of the hydrogen liberated from the steam for forming hydrochloric acid and releasing the metal of the chloride, and finally uniting said acid and released metal and forming a metallic chloride and hydrogen, substantially as and for the purpose described.

12. The herein-described process for the decomposition and formation of chloride of zinc in the manufacture of hydrogen gas, the same consisting in heating the chloride of zinc to a temperature above the melting-point of the zinc by a body of carbon in contact with the zinc and in a state of combustion, introducing steam into the carbon, subjecting the heated chloride of zinc to the action of the hydrogen generated from the steam for forming hydrochloric acid and liberating the zinc of the chloride, vaporizing the hydrochloric acid, condensing the acid fumes, and finally uniting said acid and liberated zinc and forming chloride of zinc and hydrogen, substantially as and for the purpose specified.

13. The herein-described process for the decomposition and formation of chloride of zinc in the manufacture of hydrogen gas, the same consisting in heating the chloride of zinc to a temperature above the melting-point of the zinc by a body of carbon in contact with the zinc and in a state of combustion, introducing steam into the carbon, subjecting the heated chloride of zinc to the action of the hydrogen generated from the steam for forming hydrochloric acid and liberating the zinc of the chloride, vaporizing the hydrochloric acid, introducing steam into the vaporized hydrochloric acid, condensing the acid fumes, and finally uniting said acid and liberated zinc and forming chloride of zinc and hydrogen, substantially as and for the purpose set forth.

In testimony whereof I have hereunto signed my name, in the presence of two attesting witnesses, at Syracuse, in the county of Onondaga, in the State of New York, this 25th day of August, 1898.

HENRY K. HESS.

Witnesses:
K. H. THEOBALD,
E. A. WEISBURG.